Dec. 30, 1930.        H. M. PURSEL        1,786,448
            DUPLEX POWER SCRAPER
          Filed Jan. 23, 1930    2 Sheets-Sheet 1
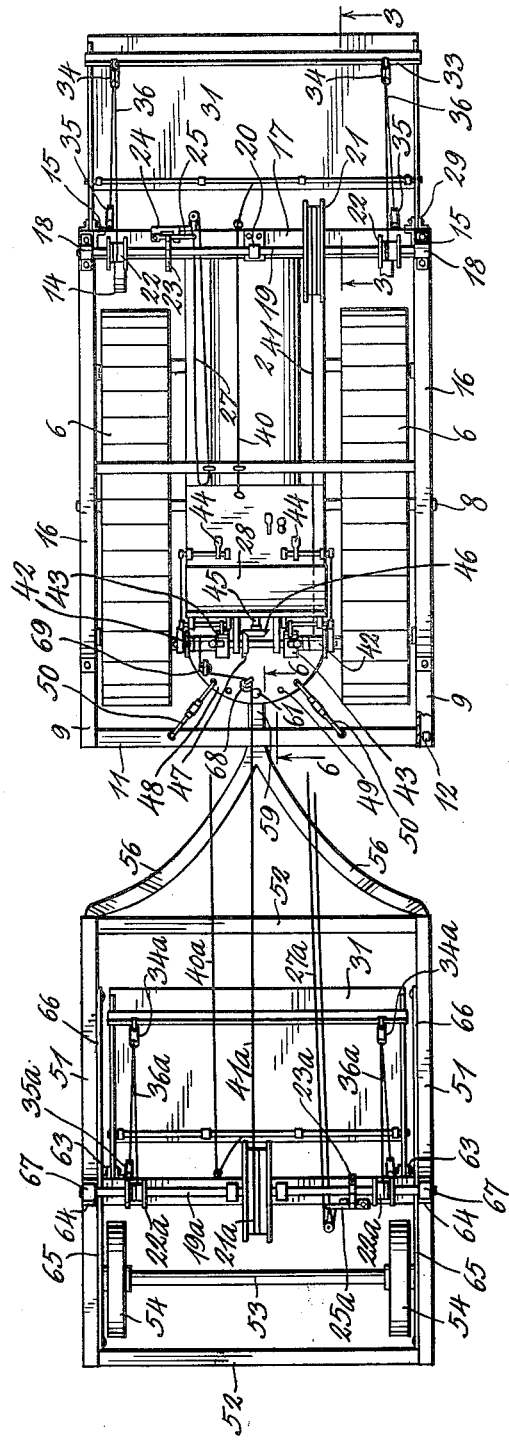
Inventor
Harold M. Pursel.
By A. J. O'Brien
            Attorney

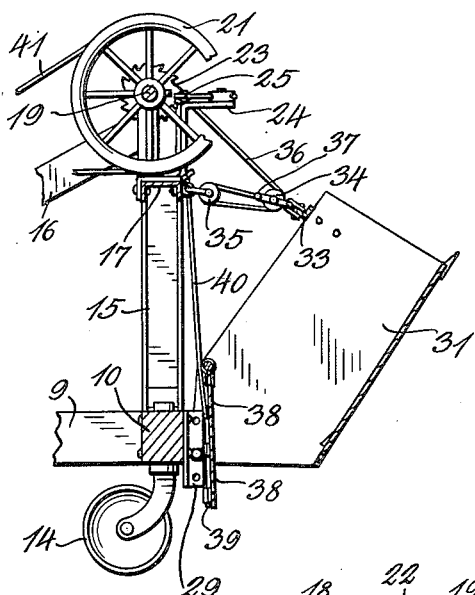
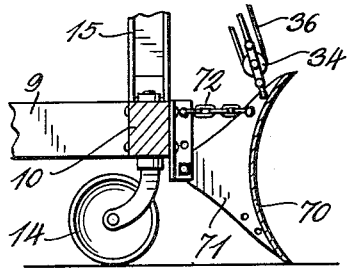
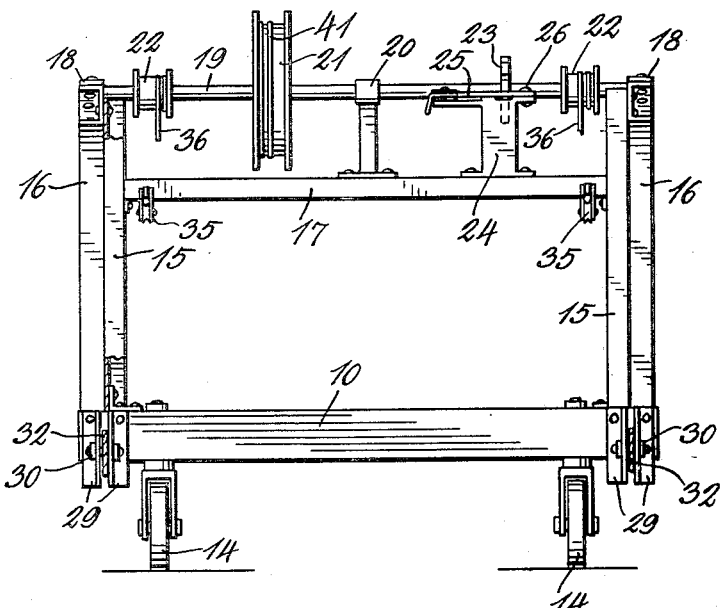

Patented Dec. 30, 1930

1,786,448

UNITED STATES PATENT OFFICE

HAROLD M. PURSEL, OF CASPER, WYOMING, ASSIGNOR TO SHARROCK AND PURSEL, OF CASPER, WYOMING, A COPARTNERSHIP CONSISTING OF W. G. SHARROCK AND HAROLD M. PURSEL

DUPLEX POWER SCRAPER

Application filed January 23, 1930. Serial No. 422,809.

This invention relates to improvements in power operated scrapers of the general type described and claimed in my copending application, Serial No. 415,928, filed December 23, 1929.

In road making and other places where a large amount of dirt is to be moved, it is desirable to be able to move this dirt as quickly as possible and as cheaply as possible.

It is the object of this invention to produce a duplex power operated scraper of such construction that it will have twice the capacity of the ordinary power operated scrapers and still require only a single tractor and a single operator for producing the power and for controlling the operation.

This invention, briefly described, comprises a frame that is removably connected with a tractor of ordinary construction and of the caterpillar type. A scraper is connected to the front end of this frame and is provided with means for tilting and dumping the same, the tilting being effected by means of power derived from the tractor. Secured to the rear end of the tractor is the front end of a trailer that comprises a rectangular frame whose rear end is supported on two wheels and whose front end is pivotally connected with the rear end of the tractor. A scraper is pivoted at its rear end to a transverse frame member located in front of the supporting wheels and which can be tilted by means of power derived from the tractor.

Having thus briefly described the invention, the same will now be described in detail, and for this purpose reference will be had to the accompanying drawings in which the preferred embodiment thereof has been illustrated, and in which:

Fig. 1 is a top plan view of my improved duplex power scraper;

Fig. 2 is a side elevation of the scraper;

Fig. 3 is a section taken on line 3—3, Fig. 1, and shows the scraper in dumping position;

Fig. 4 is a section taken on line 3—3, Fig. 1, and shows a bulldozer substituted for the scraper;

Fig. 5 is a section taken on line 5—5, Fig. 2;

Fig. 6 is a section taken on line 6—6, Fig. 1; and

Fig. 7 is a section taken on line 7—7, Fig. 2.

In the drawings reference numeral 2 represents the tractor. As the tractor employed is of standard make and construction, it will not be described in any greater detail than necessary for the purpose of properly describing the construction and the operation of the parts that form the subject matter of this invention. The tractor is of the track-laying type, usually referred to as caterpillar type, and is provided with two or more pairs of drive wheels 3 whose axles are connected by means of a beam 4 to the under side of which the rollers 5 are pivotally attached. An endless track 6 surrounds the drive wheels in the manner shown. Secured to the upper surfaces of beams 4 are bearing blocks 7 that support the shaft 8. This shaft may extend entirely across the tractor from one side to the other or may be formed from two shorter shaft sections as may be found to be the most desirable. Shaft 8 forms a support for a frame that will now be described. This frame consists of two side members 9 which are preferably steel channels and which are longer than the tractor. The front ends of beams 9 are connected by a transverse beam 10 and the rear ends are connected by another transverse beam 11. Beam 11 is held in place by bolts 12 in such a way that it can be removed when necessary. Secured to the undersides of beams 9 are bearings 13 in which the outer ends of shaft 8 are journalled. Caster wheels 14 are secured to the front ends of beams 9 and serve to support the frame in a manner obvious from the drawing. Extending upwardly from the front corners of the frame are channels 15 that together with beams 9 form the two sides of right angle triangles whose hypothenuse are formed by channels 16. A channel 17 extends transversely of the frame at a point above the channel 10 and has its ends secured to the vertical channels 15 in the manner shown in Fig. 5. Secured to the upper ends of the inclined beams 16 are bearings 18 in which the ends of shaft 19 are journalled. This shaft is also supported by a central bearing 20 that is secured to the upper surface of the transverse beam 17. Shaft 19 is provided with one large drum 21 and with two smaller drums 22, and has also secured to it a ratchet wheel 23. A support or bracket 24 is fastened to the transverse beam 17 and carries a pivoted pawl 25 that can be rotated about its pivot 26 into and out of engagement with the ratchet 23. The pawl is controlled by means of a rope or cable 27 that extends to a point in close proximity to the seat 28 where it can be reached by the operator and used for the purpose of moving the pawl into and out of engagement with the ratchet.

Secured to the front surface of the transverse beam 10 are two spaced angle irons 29. These angle irons have their forwardly extending flanges provided with a plurality of openings for the reception of the bolts or pivots 30 by means of which the scraper 31 is pivotally secured in place. The sides of the scraper have rearwardly extending portions 32 that project between the flanges of angles 29 in the manner shown in the drawing. Secured to the sides of the scraper near their front ends are hooks 33 to which the pulleys 34 are connected. Other pulleys 35 are connected with the vertical beams 15 and cables 36 have one end secured to drums 22 and the other anchored at 37. When the shaft 19 and drums 22 are rotated, cables 36 will be wound onto the drum and will raise the front end of the scraper upwardly to the position shown in Fig. 3. The scrapers are provided with hinged end gates 38 that are held in close position by means of a latch 39 which can be opened by the operator by means of a cable 40. The construction of the end gate and the latching means has been described in applicant's copending application and will therefore not be described in greater detail in this application. Secured to the drum 21 is a cable 41. This cable is normally wound several complete turns about the drum 21 and extends downwardly to a winch drum 42 located at the rear of the tractor. Drum 42 is controlled by means of a clutch 43 that is operated by means of a pedal 44 located at the front of the driver's seat. The drive shaft 45 of the tractor is provided with a bevel gear 46 that cooperates with another bevel gear 47 for the purpose of delivering power to the moving parts of the two clutches 43 and by means of the pedals 44 the operator can control either one of the two winch drums 42. When the scraper has been tilted to the position shown in Fig. 3, the pawl 25 can be moved into latching position so that the scraper will be held in this position during transportation. Secured to the rear end of the tractor is a semi-circular plate 48 that is provided with a number of openings 49. Brace members 50 extend from the transverse beam 11 to the plate 48 in the manner shown in Fig. 1 and serve to brace the frame and to hold it against transverse movement while permitting it to oscillate to a limited extent about the axis of shaft 8.

Connected with the rear of the tractor is an auxiliary scraper which is constructed in the form of a trailer. This trailer consists of a substantially rectangular frame having two parallel side members 51 that are connected at their ends by transverse members 52. A supporting axle 53 that has attached to it two supporting wheels 54 is mounted in bearings 55 that are located underneath the side members 51. Secured to the front ends of members 51 is a tongue or pull bar which consists of two curved members 56 whose rear ends 57 are secured to the front ends of members 51 by means of rivets 58. The front ends of curved members 56 are welded to a single bar 59 whose front end 60 is secured to the plate 48 by means of a bolt 61. It is apparent that when the tractor is operating, the trailer will also move and owing to the pivotal connection between the two the tractor and trailer can be turned in a very small space.

A transverse beam 62 extends between the two side beams 51 and to the front side of this beam two pair of angle iron brackets 63 are connected. These brackets correspond to brackets 29 in Fig. 2 and serve as means for connecting the scraper 31 which is held in place in exactly the same manner as described in connection with the scraper attached to the tractor frame. For the purpose of tilting the scraper two vertical beams 64 have been secured to the side beams 51 and these are braced by means of diagonal braces 65 and 66. A shaft 19a is pivotally mounted in bearings 67 secured to the upper ends of the vertical beams 64. Shaft 19a corresponds to 19 and is provided with a large central drum 21a and two smaller drums 22a. A cable 41a is wound several times around the large drum and extends forwardly and after passing over the pulleys 68 and 69 has its other end wound about one of the winch drums 42. Cables 36a that correspond to cables 36 in the device already described, have one end secured to the drums 22a and the other ends connected at 37a after having passed over the two pulleys 34a and 35a, and shaft 19a is also provided with a ratchet wheel 23a with which the pawl 25a cooperates. This pawl is controlled by means of a cable 27a and can be moved to operative or inoperative position by the operator when seated at 28.

The scraper attached to the trailer is constructed in the same manner as the one already described and the end gate can be released by a pull of the cable 40a.

In the operation of this device the front scraper is lowered to the position shown in Fig. 2 and the rear scraper is preferably held in raised position as shown in Fig. 3. The machine is then moved forwardly until the front scraper has been filled with dirt after which the operator exerting pressure on the pedal 44 that controls the lifting of the front scraper raises the latter and after this is accomplished he lowers the scraper that is attached to the trailer. The machine is then moved forwardly until the scraper of the trailer portion is filled when this is raised so that the machine can be transported to the place where the dirt is to be dumped. The dumping is accomplished by exerting a pull on cables 40 and 40a so as to release the latches of the end gates whereby the dirt will slide out of the scrapers. It may be possible to fill both of the scrapers at the same time and this can be done whenever it is found desirable to do so.

The tongue portion or pull bar comprising members 56 is so designed that the trailer and the tractor can be turned so that they extend at right angles to each other and can even make a smaller angle than ninety degrees, and therefore it is possible to make a short turn with this machine.

If the tractor is to be used for some other purpose, it can very easily be detached from the surrounding frame and this is accomplished by first removing the transverse bar 11 and then blocking up the rear end of the frame. After this is accomplished shaft 8 can be removed or the bearings 13 can be removed, thereby releasing the tractor from the frame and the tractor can then be backed out of the frame, the cables, of course, first being disconnected from the tractor.

If the duplex machine is not necessary the trailer part can be readily disconnected and a tractor with its attached scraper can be used without the trailer.

It often becomes necessary to push dirt over an embankment and for this purpose the scraper is replaced by a bulldozer 70 like that shown in Fig. 4. This consists of a curved blade having rearwardly extending plates 71 that are pivotally attached to the brackets 29 in the same way as the scraper is attached. A piece of chain 72 extends from the brackets to the upper edges of plate 71 and holds the bulldozer against rotation about its pivots. The cables 36 are also attached to the upper edges of the plates 71, all in the manner shown in Fig. 4. It is also evident that the bulldozer can be used for removing snow or for cleaning the surface of roads already built. When used as a snow plow the bulldozer should extend diagonally instead of transversely of the frame.

From the above description it will be apparent that I have produced a power operated scraper having a capacity of twice that of the ordinary single power scraper and which can therefore remove dirt at substantially twice the speed and consequently at approximately one-half the cost at which this operation can be performed by a single scraper. The two parts of this machine are interconnected and cooperate so as to function as a single unit when in operation, and at the same time they are so constructed that they can be separated one from the other and the tractor part used independently of the trailer.

Having described the invention what is claimed as new is:

A trailer attachment for a power operated scraper, comprising, in combination, a substantially rectangular frame, a supporting axle secured to the rear end of the frame, two wheels carried by the axle, the frame having a transverse beam in front of the wheels, the front end of the frame having a substantially triangular hitch frame secured thereto, the front end of the rectangular frame forming the base of the hitch frame, a scraper located within the rectangular frame, the rear end of the scraper being pivotally attached to the transverse frame member, a vertical supporting beam extending upwardly from each of the side members of the rectangular frame, a shaft rotatably supported on the upper ends of the vertical beams, means including the shaft for tilting the scraper and means for latching the scraper in tilted position.

In testimony whereof I affix my signature.

HAROLD M. PURSEL.